Sept. 3, 1929.  B. BART  1,726,974
APPARATUS FOR SILVERING GLASS MOLDS
Filed Jan. 16, 1925
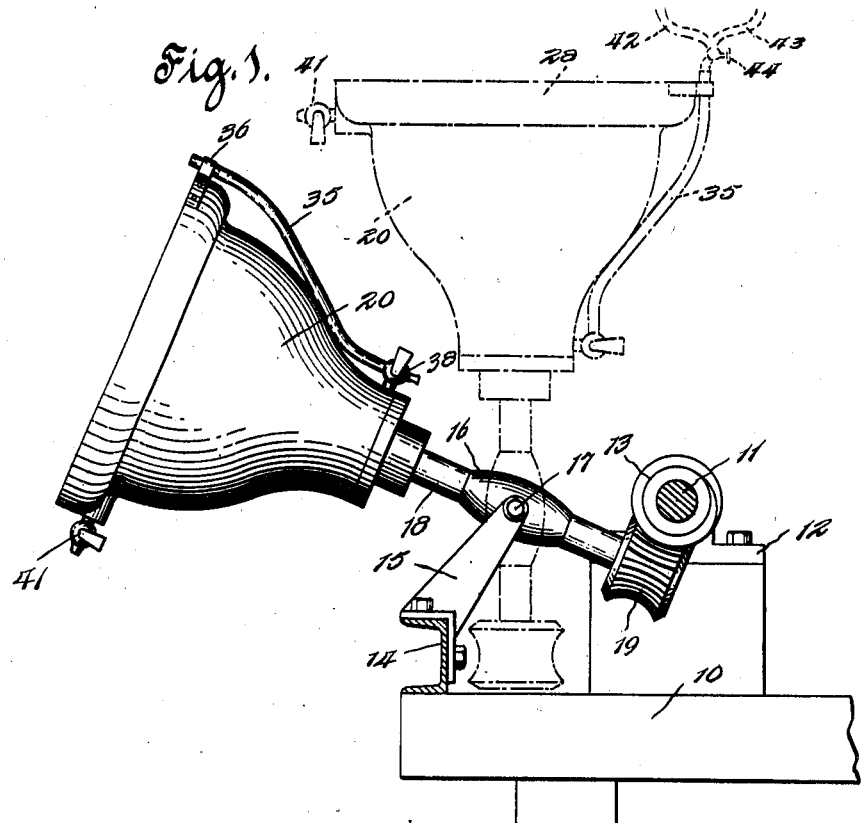
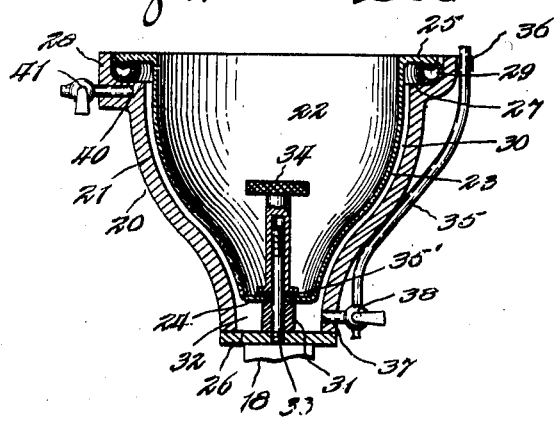
INVENTOR
Blasius Bart
BY
Warren S. Orton.
ATTORNEY Patented Sept. 3, 1929.

1,726,974

UNITED STATES PATENT OFFICE.

BLASIUS BART, OF EAST ORANGE, NEW JERSEY, ASSIGNOR TO BART REFLECTOR CO INC., OF NEWARK, NEW JERSEY, A CORPORATION OF NEW JERSEY.

APPARATUS FOR SILVERING GLASS MOLDS.

Application filed January 16, 1925. Serial No. 2,858.

The invention relates in general to a method of depositing metal, such as silver, on an article to be coated by the metal and the invention also relates to an apparatus particularly designed for practicing the method.

More specifically defined the invention relates to a method and to an apparatus for forming a silver shell on a glass mold as one step in the method of forming the reflecting surface of a metallic reflector of the type which includes a silvered face reflecting surface, reinforced by a copper backing, electrolytically deposited.

The primary object of the invention is to deposit silver economically, rapidly and efficiently so as to form a thin, homogeneous layer of silver, nickel or equivalent metal, free of air holes, impurities or other deleterious characteristics which might interfere with the formation of the electrolytically deposited backing for the same.

The method aspect of the invention is practiced by the adoption of certain modifications in the known method of "floating" on the object to be coated a solution of a silver salt together with an appropriate reducing reagent therefor. Instead of using the solutions of silver now employed, the present disclosure features the initial preparation of a highly concentrated solution and even a supersaturated solution of silver to be reduced and the employment at the instant of deposition of a solution which is abnormally weak. The solutions of silver of the strength usually employed are reduced rapidly, especially in the presence of air and accordingly one distinctive feature of the present disclosure is to use the reagents in such a way that the time element of the reducing reaction is delayed for a period sufficient to permit the formation of the deposited silver uniformally over the entire surface being coated. In one way this is attained by causing the reducing reaction to take place directly on the article to be coated but out of contact with air. Further in order to prevent localization of the reaction at any one place the silver solution and its reducing reagents are agitated while in contact with the object being coated and incidentally this agitation insures a mixing of the constituents of the coatings and insures a removing by the centrifugal action developed, of any impurities in the mixture.

Incidental to a desideratum for economy in the amount of materials used in each operation the invention features an amount of silver solution only slightly in excess of the amount required to give the requisite silver coating and by the use of the proper strength of reagents to reduce more silver out of a very weak solution than has been possible heretofore with the stronger solution used, thus minimizing the amount of waste material which must be treated to recover its silver content.

The method aspect of the invention is most conveniently practiced by causing a thin wall of an extremely weak solution of silver and its reducing reagent to rise about the object to be coated, thus forcing the air away from the surface. The surface and its layer of precipitating silver is slowly rotated during the reducing reaction, after which the excess of liquid material may be drained off from the surface, and, after washing, the surface may be subjected to the copper depositing and other succeeding steps in the manufacture of the finished reflector or other completed article formed in part by the invention herein disclosed.

Referring to the apparatus aspect of the invention the general object is to provide a simplified form of apparatus by means of which the method herein disclosed can be practiced efficiently and economically, both with reference to the amount of materials used and with reference to the labor element and the mechanical power involved in actuating the apparatus.

Another object of the invention is to provide an organization of a silvering pot and contained mold which will feature an easily manipulated means for quickly mounting the mold in air tight engagement with the pot and in accurately disposed relation to the pot to form the requisite thin, mixing and reducing chamber about the mold.

Another object of the invention is to provide an easily manipulated means for controlling the admission of the reagents to the apparatus and for discharging the refuse material at the termination of the depositing step.

Still another object of the invention is to provide a silvering coating apparatus which will minimize any tendency of the depositing silver to adhere to those parts on which it is not desired to have the silver collect.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view in side elevation of a silver depositing apparatus illustrating a means for practicing the method herein disclosed, showing in dot and dash lines a rotating silvering pot in position to receive its associated glass mold and its charge of silver forming reagents and showing in full lines the pot tilted into an operative rotating position; and Figure 2 is a sectional view taken axially through the silvering pot shown in Figure 1 with the mold secured in position and the parts disposed to receive the silver depositing reagents.

In the following description and in the claims, parts will be identified by specific names for convenience of expression but they are intended to be as generic in their application to similar parts as the art will permit.

In the drawings there is shown a support 10 for carrying a plurality of silvering units of which one is shown in this disclosure but it is understood that in factory construction the units are arranged in groups of four or five or as many as can be attended to conveniently by one operator. There is disclosed a constantly rotating power shaft 11 mounted in bearings 12 and on which shaft are disposed a plurality of worms 13, one for each of the units herein disclosed. Also positioned on the support 10 in advance of the shaft 11 is a longitudinally extending frame 14 in the form of a U-bar on which are mounted a plurality of pivot blocks 15, one for each of the units and each positioned in advance of its associated worm 13. Pivotally mounted in the pivot block 15 is a long sleeve 16 constituting a bearing rotatable about a horizontal axis provided by the pivot pins 17. In this bearing is rotatably mounted a short pot shaft 18 to the inner or lower end of which is secured a worm gear 19 designed when the shaft 18 is tilted into the position shown in full lines in Figure 1, to engage the underside of the associated worm 13, in position to be driven thereby. The parts are so arranged that when the shaft 18 is in its vertically disposed position shown in dot and dash outlines in Figure 1 the gear 19 is disconnected from its associated worm 13 and the shaft is held stationary by the frictional resistance present. When tilted into the inclined position, as shown in full lines, a driving connection is provided between the shafts 11 and 18 and gearing is designed to provide for a relatively slow rotation of the shaft 18 and of the silvering pot 20 and associated parts carried thereby.

It has been found experimentally that the best results are attained when the shaft 18 is inclined to the horizontal about 23°.

In order to economize in the amount of silver material used, the pot 20 is designed to have its inner surface 21 approximately the configuration of the articles to be silvered. In the present instance there has been selected for illustration the forming of a metallic reflector of somewhat parabolic design, but the invention finds its most practical field in forming irregularly shaped surfaces and surfaces such as distorted parabolics and corrugated forms which have not been possible to form heretofore. These reflectors are usually formed on the outer side of a hollow polished glass mold 22 which comprises a body portion 23 somewhat parabolic in outline, a flat bottom 24, and an outstanding flange 25 defining the open top. The pot 20 is of somewhat similar configuration to the mold and is provided with a wide open top to receive the mold. In the illustrated showing the inner surface 21 converges downwardly and rounds into a small flat bottom 26.

The bottom 26 is secured to the outer or upper end of the shaft 18 and the pot is disposed so as to be symmetrical with reference to the axis of rotations of the shaft and arranged so that the pot and the located mold will rotate about this axis.

The open top of the pot is outlined by a stepped rim which provides a gasket seat 27 outlined by an upstanding flange 28. A gasket 29, preferably a rubber hose filled with water, is positioned on the seat and resting on the gasket is a flange 25 of the glass mold. The flange 25 is designed to fit with a loose fit within the annular flange 28 in the pot so that the mold is at least approximately centered within the pot and in spaced relation to its inner wall.

Preferably, the inner surface 21 of the pot is lacquered daily with a solution of gun cotton to permit the easy reclaiming of the deposited metallic silver. The interior surface 21 of the pot is of only slightly larger diameter than the corresponding section of the external surface of the mold so as to form a thin silver depositing and mixing chamber 30 therebetween. The bottom 24 of the glass mold is spaced from the bottom 26 of the pot by means of a buffer 31 preferably a rubber sleeve and the parts are so proportioned that a relatively large refuse chamber 32 is formed between the bottom of the glass mold and the bottom of the pot.

For the purpose of quickly and positively securing the glass mold in position in the pot a clamping screw 33 is secured centrally to the end of the shaft 18 and projects axially upwardly through the bottoms 26 and 24 and through the buffer into the center of the mold. A clamping screw 34 engaging the screw 33 acts through a washer 35 to bear down on the bottom 24 of the glass mold and thus force the flange 25 into air-tight engagement with the gasket 29. In this way there is provided an air-tight closure to the depositing chamber 30.

In handling silver solutions and their reducing reagents, especially when in concentrated form, it is necessary to keep the reagents apart up to the time when they are to be used. The reagents are supplied through a supply pipe 35 secured to the side of the pot 20 by means of a bracket 36. This supply pipe leads to an intake port 37 in the side of the pot and adjacent the bottom 26. The supply is controlled by a three-way cock 38 which, in one position opens the supply pipe to the port 37 and in another position permits the liquid in the pot to drain therefrom through the discharge port 37 and cut through a discharge vent 39 in the cock 38.

The pot is provided adjacent its upper portion with an air vent passageway 40 controlled by a two-way cock 41. The supply pipe 35, cocks 38 and 41 are preferably formed of celluloid.

There is indicated at 42 a source of supply of a silver salt solution and at 43 there is indicated a source of supply of a reducing reagent therefore which sources lead to the intake end of the pipe 35 and are controlled by a pinch cock 44.

It is a feature of this disclosure that the silver solution prepared for the source 42 be of greater concentration than is usually employed in methods of the class under discussion. In the instant case a water solution is prepared of about 150 grains of silver per gallon of water. This stock solution is prepared with distilled water following conventional practice and each day the amount required for use that day is diluted to about 25 grains per gallon with ordinary city water. It has not been possible to use ordinary city water in preparing the silver solution in the methods that have been practiced heretofore, due to the fact that impurities in the water contaminated the silver layer formed on the mold and such contamination, which sometimes include air holes, prevent the subsequent formation of a continuous coating of copper when attempts were made to back the silver layer with electrolytically precipitated copper. The reducing solution, usually Rochelle salts, is prepared in such concentration as will be sufficient at least approximately, to reduce the amount of silver present when the two reagents are brought together in the depositing and mixing chamber within the silvering pot.

In operation and with the pot in the vertical position shown in ghost outline in Figure 1, the operator positions a clean and polished glass mold in inverted position in the pot with the flange resting on the gasket at the open end of the pot. He disposes the clamping nut in position to clamp the mold securely to the pot and with a few turns of the nut an air tight seal is attained between the mold and the pot. A measured amount of the silver solution and its reducing reagent is permitted to flow from their respective sources through the supply pipe; through the open cock 37 and the well of reagents is permitted to rise in the depositing chamber, forcing the air in advance out through the air vent cock 41. When the solution begins to overflow from the upper cock its handle is turned to closed position, the supply is shut off. The depositing chamber is thus filled with the reagents held in the air tight compartment. The pot is then quickly tilted forwardly into the inclined position shown in Figure 1 and the driving connection with the constantly rotating shaft 11 is made. On the first rotation of the pot, the reagent remaining in the supply tube 35 is drained therefrom and permitted to flow into a catch trough from which the material is conducted to the waste silver recovering apparatus forming no part of this disclosure. The pot is then permitted to rotate for about a minute after which it is lifted into its original vertical position thus automatically breaking the rotary driving connection with the shaft. The cock 38 is shifted into position to permit the liquid to drain out of the discharge port into the catch trough for the recovery of any remaining silver. The clamp screw 34 is loosened, the glass mold with its silver layer adhering thereto is removed, washed and passed on to the succeeding step in the process of forming the metal reflector.

During the time that the pot is rotating there is apparently some flow of the reagents despite the fact that the layer is quite thin, for there is attained a uniformity of thickness in the resulting layer such as is not present in the absence of this rotary movement. Further by this rotary movement there is attained an extremely pure brilliant surface in connection with the glass mold. This is apparently due to the fact that impurities in the reducing reagents are forced centrifugally away from the glass surface being coated. As these impurities are formed in the refuse chamber 32 it is assumed that they flow down the side of the pot away from the glass mold and finally collect in the refuse chamber at the bottom of the pot.

By means of the method and apparatus herein disclosed it is possible to form a thin silver shell on a glass mold economically and with the use of the least possible amount of material. The amount of materials used and the proportion can be set so that the amount of waste material necessary to be treated to recover its silver content is reduced to a minimum and the amount of the recovered silver per operation is reduced to a minimum. Further featuring the element of economy it is possible to use ordinary city water, thus saving in the cost of distilled water which amounts to a material expense where the operation is practiced on a large scale. An extremely brilliant and homogeneous reflecting surface is formed despite the use of an extremely dilute silver solution; despite the use of ordinary city water; and despite the presence of impurities which are found in the commercial grades of reagents used.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a horizontally disposed power shaft, a worm carried by said shaft, a pivot block offset laterally from said shaft, a bearing pivoted to said block for swinging movement about a horizontal axis, a pot shaft journalled in said bearing, a silvering pot carried by said pot shaft, a worm gear secured to said pot shaft disconnected from the worm when the pot shaft is vertically disposed, and adapted to be moved into mesh with the underside of the worm whereby the pot is held in tilted position by and is rotated from the power shaft when the pot is tilted into position to cause the worm and worm gear to intermesh.

2. In a device of the class described, the combination of a power shaft provided with a worm, a pivotally mounted pot shaft provided with a worm gear adapted to engage the underside of the worm to be driven thereby, said pot shaft held in inclined position by its engagement with the worm, and movable away from the same and into an upright position to disconnect the worm gear from the worm and thus intercept the driving connection between the power shaft and the pot shaft.

3. In a device of the class described, the combination of a silvering pot mounted for rotary movement means for securing a mold in the pot and with the surface thereof to be silvered in spaced relation to the inner surface of the pot providing a silvering fluid receiving space of fixed width between the pot and mold, means for rotating the pot and mold, and means for turning the pot into position with its axis of rotation inclined to both the vertical and horizontal.

4. In a device of the class described, the combination of a silvering pot having an inner bowl-shaped surface with a prescribed configuration and a glass mold fitted in the pot, having an external surface to be silvered conforming somewhat to the inner surface of the pot and forming therewith a thin space for containing the silvering material to be deposited on the mold surface and means coacting with said silvering pot and glass mold for closing said thin space thereby to prevent exposure of the silvering material to the external air.

5. In a device of the class described, the combination of a pot mounted for rotary movement about an axis of rotation, said pot having a fixed inner surface accurately disposed symmetrical relative to said axis means mounting the pot for rocking movement about said axis, a mold within said pot and having a fixed external curved surface substantially conforming to the inner surface of the pot, spaced slightly therefrom and forming therewith a thin depositing chamber, and means for rotating said pot and mold about said axis when inclined to the vertical.

6. In a device of the class described, the combination of a silvering pot mounted for rotary movement about an axis inclined to the vertical, said pot provided with an easily manipulated clamping and locating means for securing therein a mold to be silvered.

7. In a device of the class described, the combination of a silvering pot mounted for rotary movement, means for securing a mold in the pot and with the surface thereof to be silvered in pre-fixed space relation to the inner surface of the pot and means for rotating the pot and mold.

8. In a device of the class described, the combination of an open top silvering pot, a mold positioned within said pot, spaced from the bottom thereof to form a refuse chamber and spaced from the inner side thereof to form a shallow depositing chamber, and means for sealing the mold in said pot.

9. In a device of the class described, the combination of a silvering pot mounted for rotary movement and provided with means for securing a mold therein with an air tight space between the mold and pot.

10. In a device of the class described, the combination of an open top silvering pot provided with an outstanding flange defining the open top, a gasket seated on said flange, a mold positioned in said pot and provided with a flange seated on the gasket and forming with the inner side of the pot an air tight chamber and means for removably securing the mold in place.

11. In a device of the class described, the combination of an open top silvering pot, a stepped rim outlining the open top and providing a gasket seat, a gasket on said seat, a mold positioned in the pot and outlined by a flange sealed on said gasket, said flange fitted within the stepped rim to locate the mold in the pot.

12. In a device of the class described, the combination of a hollow silvering pot having a closed bottom, a mold positioned within said pot, and means secured to the bottom of the pot, projecting upwardly therefrom along the axis of the pot and passing through the mold for centering the mold in the pot to provide a depositing chamber between the mold and the inner side of the pot.

13. In a device of the class described, the combination of a hollow, open top pot, a clamping screw projecting upwardly from the bottom of the pot, a bumper surrounding said screw, a glass mold positioned in said pot resting on the bumper, a gasket between the mold and pot, and a clamping screw in threaded engagement with the screw for forcing the mold into engagement with the gasket and bumper, said mold being otherwise spaced from the pot to form a fluid containing space.

14. In a device of the class described, the combination of a hollow, open top pot, a clamping screw projecting upwardly from the bottom of the pot, a bumper surrounding said screw, a glass mold positioned in said pot and resting on the bumper, a gasket between the mold and pot, and a clamping screw in threaded engagement with the screw for forcing the mold into engagement with the gasket and bumper.

15. In a device of the class described, the combination of a silvering pot having a lacquered inner surface, a glass mold within said pot and having a surface to be silvered facing said inner lacquered surface, means for hermetically sealing the space formed between the mold surface and the lacquered surface and means for introducing a silver solution and reducing reagent therefor to the space between said mold surface and said lacquered surface.

16. In a device of the class described, the combination of a silvering pot having an inner surface with a prescribed configuration curved in two dimensions and a glass mold fitted in the pot having an external surface to be silvered conforming somewhat to the inner surface of the pot and forming therewith a thin space for containing the silvering material to be deposited on the mold surface and an inlet for supplying said material to the lower portion of said thin space.

17. In a device of the class described, the combination of a silvering pot having an inner surface with a prescribed configuration and a glass mold fitted in the pot having an external surface to be silvered conforming somewhat to the inner surface of the pot and forming therewith a thin space for containing the silvering material to be deposited on the mold surface, an inlet for supplying said material to the lower portion of said thin space, and an air vent for permitting the escape of air from the upper portion of said thin space.

18. In a device of the class described, the combination of a hollow, open top pot, a clamping screw projecting upwardly from the bottom of the pot, a bumper surrounding said screw, a glass mold positioned in said pot resting on the bumper, a gasket between the mold and pot, a clamping screw in threaded engagement with the screw for forcing the mold into engagement with the gasket and bumper, said mold being otherwise spaced from the pot to form a fluid containing space and a supply port leading to said space.

19. In a device of the class described, the combination of a silvering pot having an internal surface with a configuration substantially that of the external surface of the article to be silvered, means for securing the article in place in said pot and means for supplying a silver depositing liquid to said pot and for draining the refuse of the liquid from the pot.

20. In a device of the class described, the combination of a silvering pot, having an outlining side and a bottom, a mold support centered on the bottom, spaced from the outlining side and forming a refuse chamber in the pot and below the top of the support.

21. In a device of the class described, the combination of a silvering pot, having an outlining side and a bottom, a mold support centered on the bottom, spaced from the outlining side and forming a refuse chamber in the pot and below the top of the support, and a mold clamp projecting upwardly from said support.

22. In a device of the class described, the combination of a silvering pot mounted for rotary movement about an axis inclined to the vertical, said pot provided with means for securing therein a mold to be silvered, means for supplying a silver depositing solution to the space between the inner side of the pot and the outer side of the contained mold and means for drawing off from said space any surplus solution.

23. In a device of the class described, the combination of a power shaft provided with an element of a driving connection, a pot shaft offset from the power shaft, mounted for rotary movement about its own axis and mounted for free rocking movement in a plane perpendicular to the power shaft and about a fixed axis, said pot shaft provided at its lower end with a driving element adapted to be elevated with the rocking movement of the pot shaft into driving relation with the underside of the coacting driving element on the power shaft and held gravitationally in driving engagement therewith and a silvering pot at the upper end of the power shaft and rotated by the pot shaft when moved into driving relation with the power shaft.

Signed at East Orange in the county of Essex and State of New Jersey this 10th day of December, A. D. 1924.

BLASIUS BART.